Patented May 9, 1939

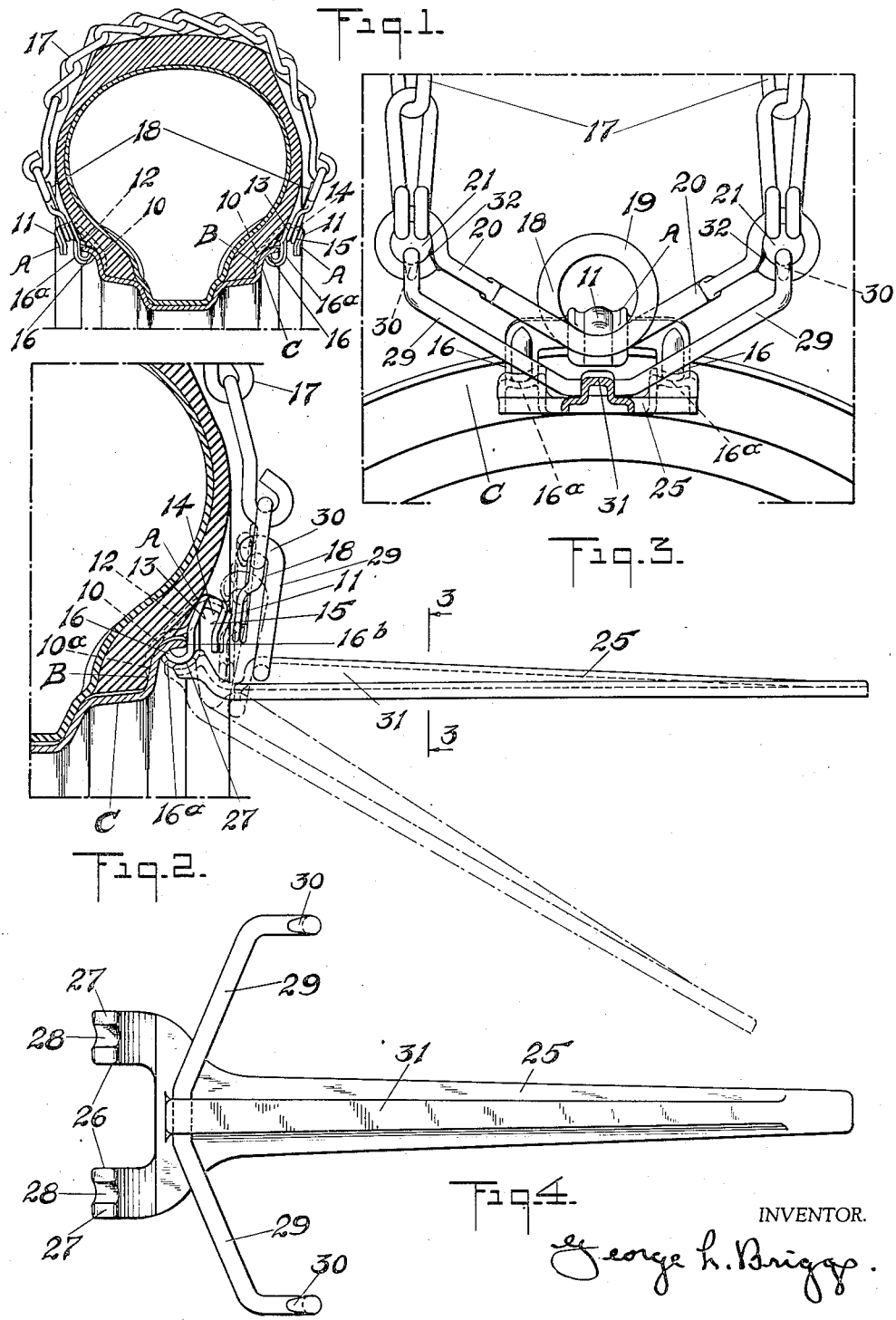

2,157,687

UNITED STATES PATENT OFFICE 2,157,687

SKID CHAIN APPLYING MECHANISM

George L. Briggs, Oneida, N. Y.

Original application July 30, 1936, Serial No. 93,359, now Patent 2,074,534, dated March 23, 1937. Divided and this application February 10, 1937, Serial No. 125,051

2 Claims. (Cl. 254—78)

This invention relates to a tool for applying skid chains for automotive vehicles having resilient tires.

This application is a division of application No. 93,359, filed July 30, 1936, patented March 23, 1937 as Patent No. 2,074,534 for Skid chains, and the object of the present invention is to provide a tool by which skid chains of the general type disclosed in the said application may be readily applied to a vehicle wheel.

With this object in view, the invention comprises the features, details of construction and combination of parts which will first be described in connection with the accompanying drawing and then more particularly pointed out.

Referring to the drawing:

Fig. 1 is a sectional view, on a small scale, of a rim and tire with a chain secured in place to illustrate the general type of skid chain with which the tool is to be combined in use.

Fig. 2 is a sectional view of a tire and a rim, showing the tool, or yoke-engaging device, mounted as in applying a skid chain to a tire.

Fig. 3 is a side elevation broken away and partly in section on the line 3—3 of Fig. 2.

Fig. 4 is a plan view of the tool for attaching the skid chains to the hook-carrying members.

A description will be given first of one form of skid-chain device, or traction increasing means, particularly constructed for use in combination with the tool or yoke-engaging device of the present application and thereafter one form of tool will be described in detail.

Referring to the drawing, A is a hook-carrying member, advantageously formed from a plate of sheet steel and having means for engaging the outside peripheral surface B of the rim, this means, in the present example, consisting of a tongue 10 arranged to fit between the bead of the tire and the rim, this tongue being given any configuration necessary, both in a transverse and longitudinal direction, to have it match that external part of the rim upon which it is mounted, so that the tongue may be held firmly against the outside peripheral surface of the rim by the tire when the latter has been inflated. In the best embodiment of the invention the under side of this tongue adjacent the free end may be knurled, as at 10a, to increase the hold of the tongue on the outside surface of the rim. The hook-carrying member A also has a hook 11 whose walls extend upward as indicated at 13, outward as shown at 14, and downward as shown at 15, to provide a space within the hook to receive the loop or eye of the yoke device, the hook facing toward the center of the wheel when mounted thereon. It is to be noted that the walls 13 and 15 have flat inner plane faces parallel to each other, but not parallel to the plane of the face of the complete rim, the said inner faces of the hook sloping toward the plane of the face of the rim considered in the direction from the outside of the rim toward its center. The purpose of this slope will be explained hereinafter in connection with the description of the yoke device. For the purpose of giving transverse strength to the tongue 10 and hook 11, a rib is formed extending along these parts, as by pressing it up from the metal, as indicated at 12, Figures 1, 2.

The hook-carrying member is provided, also, with means for engaging the inner peripheral surface C of the rim. In the present example, this means comprises a plurality of claws 16, one at each side of the hook, these claws being formed to clear the edge of the rim, sufficiently to pass over a rolled edge, if the rim has such, and to extend in a direction to engage the inner peripheral surface of the rim, as will be clear from Figures 1, 2. In practice, the claws may be reinforced by ribs 16a, as shown in the drawings, in order to strengthen them.

The hook-carrying member A is put in place on a rim, when the tire is in a deflated condition, by first hooking the claws inside the rim, with the tongue 10 held up away from the outer peripheral surface of the rim. Then the tongue 10 is moved down into contact with the outer periphery of the rim until the inner faces of the claw shanks contact the face or edge of the rim, as at 16b, the shoe of the tire being pushed aside, if necessary, for that purpose and then brought back so as to rest upon the tongue. It will be seen in mounting the hook-carrying member A in this manner that the rim edge has been encompassed by the tongue and claws of the hook-carrying member, the claw shanks serving as a means to engage the edge of the rim and thereby determine the position of the tongue and the claws, proper, relative to the rim. Furthermore, the inner plane parallel faces of the hook will be made to assume a predetermined angular position with respect to the plane of the face of the rim upon which it is mounted. The mating hook-carrying member is attached in a similar way to the opposite face of the rim, at a point opposite the first one.

As is usual, more than one set of skid chains are to be applied, three sets being advisable, these being generally located about 120° apart on the wheel. The hook-carrying members for all sets desired are put in place while the tire is deflated. Then the tire is inflated, as usual, which results in holding the hook-carrying members firmly to the rim. It will be noted that where the tongue 10 of a hook-carrying member is provided with the rib portion 12, this rib is buried in the rubber of the shoe, which aids in preventing any shifting of the hook-carrying member along the periphery of the rim. At the same time the height of the rib 12 is not so great as to cause injury to the tire.

With the hook-carrying members in place, the vehicle may be operated without chains until such time as these are required.

Each of the set of skid chains comprises a plurality of chains 17, arranged to be placed transversely of the tread of the tire. In the example illustrated, two chains are employed in each set, the ends of these chains being secured to yoke devices 18. Each yoke device has an enlarged central portion arranged to fit into the hook 11 formed by the walls 13, 14 and 15 and has each of its ends connected to the corresponding end of the chain. In the present example, the yoke device comprises a metallic bar whose central portion is bent to form a central coil 19, into the opening of which the hook can enter, the depth of the hook space being greater than the radial width of the annular portion of the coil so that the central portion may have a limited range of movement in the direction of the length of the hook without being released therefrom. The thickness of the metal of the coil is such that it will fit into the hook but will be held by the walls 13 and 15 at an angle to the face of the rim. To insure this, it is important to make the coil with flat faces at each side, which can be done by flattening the coil. This also strengthens the coil in the direction of the pull on it. The yoke device has two arms 20, each extending in an opposite direction to the other from the coil 19, the free ends of these arms carrying eyes 21 to which the chains are connected. These arms, in the best embodiment of the invention, are offset from the coil so as to stand away from the side of the tire as shown in Figure 1. The eyes are larger than the diameter of the metal of a chain link, to provide for the insertion of a tool used in applying the chains to the hook-carrying members, as more fully explained hereinafter. The ends of the chains are connected to the respective eyes in any usual way. This may be done by using an open link at the end of the chain, inserting the link ends into the eye and then closing the open link, as shown in Figure 3. Instead of this the eyes on the ends of the yoke device may be first formed as open or slit eyes, while the chain link may be entire. The link may be slipped over the metal of the corresponding open eye, and the latter then closed to prevent withdrawal of the links. In the best embodiment of the invention, the eye is welded, as at 32, so that it cannot be pulled open.

As a set of skid chains has a yoke device at each end of the chains, the set may be put in place in its hook-carrying members by first inserting a yoke-device in the hook of one hook-carrying member, then placing the chains transversely across the tread of the tire, and finally inserting the second yoke-device in the hook of the coacting or mating hook-carrying device.

When the yoke devices are rigid, it is necessary to pull the chains down to compress the tire, in order to get slack enough to allow the central portion of the second yoke devices to pass over the end of the hook of its coacting hook-carrying member after which it will enter the space between the walls 13 and 15 of the hook and be retained therein. However, to avoid the necessity for compressing the tire so much, it is advantageous to make the yoke devices resilient, as, for example, by forming the coil 19 and the arms 20, of spring steel of such dimensions that they will act as an elastic tensioning means between the chains and hooks. As will be clear from Figure 1, the enlarged central portion of the yoke device is held at an angle to the plane of the face of the rim by the walls of the hook which it engages, whereby the eyes of the yoke device and the chains will be held away from the sides of the tire, to an extent sufficient to allow the tire to expand laterally as it does when compressed by the roadway, thereby preventing unnecessary chafing or wear of the tire shoe on the chains due to this distortion of the tire. The elasticity of the yoke devices serves to maintain a tension on the hook, to prevent the central portion of the yoke device escaping from the hook. Furthermore, owing to the size of the hook and of the said central portion, the latter has to move a relatively considerable distance before it will disengage. When the chains are in place on a wheel and the wheel rotates, the skid device will be brought in contact with the roadway, and at that time will serve to increase the traction of the wheel, particularly if the roadway is icy or muddy, as the chains will bury themselves in the ice or mud and thus prevent the wheel from spinning. Any strain on one chain will not only be resisted by the elastic reaction of the yoke arm to which said chain is connected, but also will in part be transmitted to the companion chain, because the coil at the enlarged central portion which is engaged by the hooks will serve as a bearing in the hook for its yoke device and allow the same to swing angularly on such bearing, thereby pulling the other or companion chain more tightly against the tread of the tire. In practice, the hook has the inner surface of the wall 14 convexly curved transversely, the curvature being of a smaller radius than the radius of the inside of the eye of the coil, thus allowing for a certain amount of tilting or swinging of its yoke device. Furthermore, this difference in curvature prevents clamping or seizing of the hook, in cases where the load, or pull, on the yoke device results in a contraction of the inside diameter of coil, and thereby always maintains a freely movable bearing. It will be noted that the hook-carrying member acts on the principal of a lever, the fulcrum of which is in the line of contact of the claws with the inside peripheral surface of the rim, the point of application of the power is at the hook, and the resistance may be considered as about at the inner end of the tongue. Since the leverage of the resistance is much greater than the leverage of the power the resistance necessary to overcome the power or pull on the hook is reduced materially. The upward pull of the chains and their yoke devices on the respective hooks falls but slightly outside the points of engagement of the claws with the inside periphery of the rim. Thus the claws transmit practically the entire pull of the chains to the rim.

Because of the greater leverage of the resistance, the tire, inflated against the tongue, is not called upon to any great extent to hold the hook-carrying members in place when the chains are in place. Of course, when the chains are removed, the tire serves to retain the said hook-carrying members against displacement, but at this time there is no load on them. If the tire at any time deflates while running, the hook member is free to swing about its fulcrum so that the hook can swing outward and then inward, the tongue shifting in a transverse direction from the outer periphery of the rim, thus avoiding further injury to the tire shoe, as would occur if the hook could not yield.

The yoke device has its arms extending from the central portion at an angle to each as shown in Figure 3. This angle is such that the chains will be of the proper length to pass from one side of the wheel to the other side over the tread of the tire. It will be seen that the same length of chain may be used for tires of somewhat different diameters, by merely varying the said angle between the arms, which leads to some economy in manufacture, as it avoids the necessity of making different sized chains for the different sizes of tires within a certain range of tires.

Means are provided for applying the yokes carrying the cross chains to the hooks upon the rim, these means consisting of a lever 25, having a fork at one end, this fork having branches 26 which are bent up at an angle to the longitudinal axis of the lever and have ends indicated at 27 arranged to ride on the surfaces of the claws. The ends 27 are provided with recesses, as indicated at 28, to receive the ribs 16a of the claws, thus properly positioning the tool on the claws. To the lever is journaled a yoke-engaging device having arms 29 extending at angles to each other, as shown in Figure 3, each arm having a hook 30 at its end arranged to enter the corresponding eye 21 in the yoke device.

In practice, the lever 25 is made from pressed sheet steel with a rib 31 along its upper surface, this rib being hollow, as shown in cross-section, Figure 3. Also the metal of the lever is flanged downward, as shown in cross-section, Figure 3, to strengthen the lever. The yoke-engaging device may be made from a round bar, and its central portion passes through the rib 31 of the lever 25 and is capable of angular motion with relation thereto.

To apply a set of emergency chains to a wheel having the above-described hook-carrying members upon the rims thereof, it is only necessary to place the central coil of one yoke device upon the hook member mounted upon the inside of the wheel, which can be done by extending one hand part way around the tire at the rear or forward part of the wheel, then while holding the said yoke device in place in said hook, grasp the other yoke device with the other hand and draw the cross chains transversely across the face of the tire until the coil of its yoke device lies adjacent the hook member mounted upon the outside of the wheel, then insert the hooks of the yoke-engaging device, Figures 2, 3, mounted upon the lever, into the respective eyes of the yoke device, place the recesses formed in the forkd arms of the lever so as to engage the ribs formed upon the claws of the hook-carrying member, and exert a pressure upon the handle of the lever inward toward the center of the wheel. This pulls the yoke member and its central coil into a position, as best shown in broken lines, Figure 2, where the eye of the coil may be readily placed over the hook of the outer hook-carrying member. Then upon release of the pressure upon the lever handle, the coil may be guided into its proper place between the inner parallel faces of the walls of the hook. To remove a set of chains from the wheel it will only be necessary to mount the tool as heretofore explained and reverse the process.

On account of the stresses thrown upon the eyes of a yoke device by the yoke-engaging device when mounting the chains, it is advantageous to have the eyes of the yoke members, solid, that is, without a slit. This can be done by welding the free end of each eye to its respective arm.

By the terms, outer periphery of the rim or outer peripheral surface of the rim, mentioned herein, is meant that surface with which the tire contacts, irrespective of the convolutions of said surface, and by the terms inner periphery of the rim or inner peripheral surface of the rim is meant that surface of the rim to which the spokes of a wheel are attached.

What is claimed is:

1. A device for applying, to automotive vehicle wheels having rims and resilient tires, a skid-preventing device comprising a plurality of skid chains connected at each end to eyes in the ends of yokes arranged to be engaged by hook devices carried by the rim, said applying device comprising a lever having one end forked, said forks being arranged to engage and take a fulcrum-bearing on one of said hook devices, within the plane of the outside face of the wheel, said applying device also comprising an upwardly swinging means journaled on the lever outside the fulcrum-bearing about an axis substantially parallel to the plane of the face of the wheel and provided with a plurality of hooks each arranged to engage the eyes in the respective yoke ends.

2. A device for applying to automotive vehicle wheels a skid-chain device comprising yoke devices having eyes, skid-chains connected to said eyes, and hooks arranged to be engaged by the yoke members and having two claws engaging the inner peripheral surface of the rim and provided with ribs, said applying device consisting of a lever with a forked end whose branches are grooved to engage and fulcrum on the ribs of the respective claws of the hook, said lever carrying an angularly movable yoke-engaging member journaled in the lever on an axis parallel to the plane of the face of the wheel and arranged to swing upwardly, said yoke-engaging member having two hooks arranged to enter the eyes of the respective yoke device, whereby the yoke device may be pulled down to engage it with the hook.

GEORGE L. BRIGGS.